(12) United States Patent
Iwai (10) Patent No.: US 6,703,915 B1
(45) Date of Patent: Mar. 9, 2004

(54) MAGNET ROLLER (75) Inventor: Masaharu Iwai, Tochigi (JP)

(73) Assignee: Kaneka Corporation, Osaka (JP)

( * ) Notice: Subject to any disclaimer, the term of this patent is extended or adjusted under 35 U.S.C. 154(b) by 22 days.

(21) Appl. No.: 10/169,626

(22) PCT Filed: Sep. 1, 2000

(86) PCT No.: PCT/JP00/05939

§ 371 (c)(1),
(2), (4) Date: Jul. 2, 2002

(87) PCT Pub. No.: WO01/52278

PCT Pub. Date: Jul. 19, 2001

(51) Int. Cl.[7] ................................................ H01F 7/02
(52) U.S. Cl. ...................................... 335/296; 335/302
(58) Field of Search ................................ 335/296–306; 399/267, 277, 282

(56) References Cited

FOREIGN PATENT DOCUMENTS

| JP | 7-36282 A | * | 2/1995 |
|---|---|---|---|
| JP | 10-41128 A | * | 2/1998 |

* cited by examiner

Primary Examiner—Ramon M. Barrera
(74) Attorney, Agent, or Firm—Brinks Hofer Gilson & Lione (57) ABSTRACT

To provide a magnet roller having a high magnetic force at low cost even if magnetized in a relatively weak magnetic field, having a magnetic force (800 G or higher) sufficient for development even if a plurality of magnetic poles are provided in a main magnetic pole part, and having good resistance to oxidation. The magnet roller (1) of the present invention includes a body part (3) and a shaft part (2) supporting both ends of (3). A plurality of magnetic poles are provided in a magnetized manner in an outer peripheral face of (3), made up of a rare-earth bond magnet made of rare-earth magnetic powder having a composite phase of a hard magnetic phase and a soft magnetic phase both magnetically exchange-interacting with each other and having a coercive force (iHc) of 5 KOe or lower and a residual magnetic flux density (Br) of 5 KG or higher.

8 Claims, 8 Drawing Sheets

MAGNET ROLLER

RELATED APPLICATIONS

This application is a nationalization of PCT application PCT/JP00/05939 filed Sep. 1, 2000. This application claims priority from the PCT application and Japan Application Serial No. H12(2000)-000960 filed Jan. 6, 2000.

BACKGROUND OF THE INVENTION

1. Field of the Invention

The present invention relates to a magnet roller incorporated in an electrophotographic device using an electrophotographic process in an image forming apparatus such as a copying machine, laser printer, or facsimile receiving equipment or the like.

2. Description of the Related Art

Figure 9:
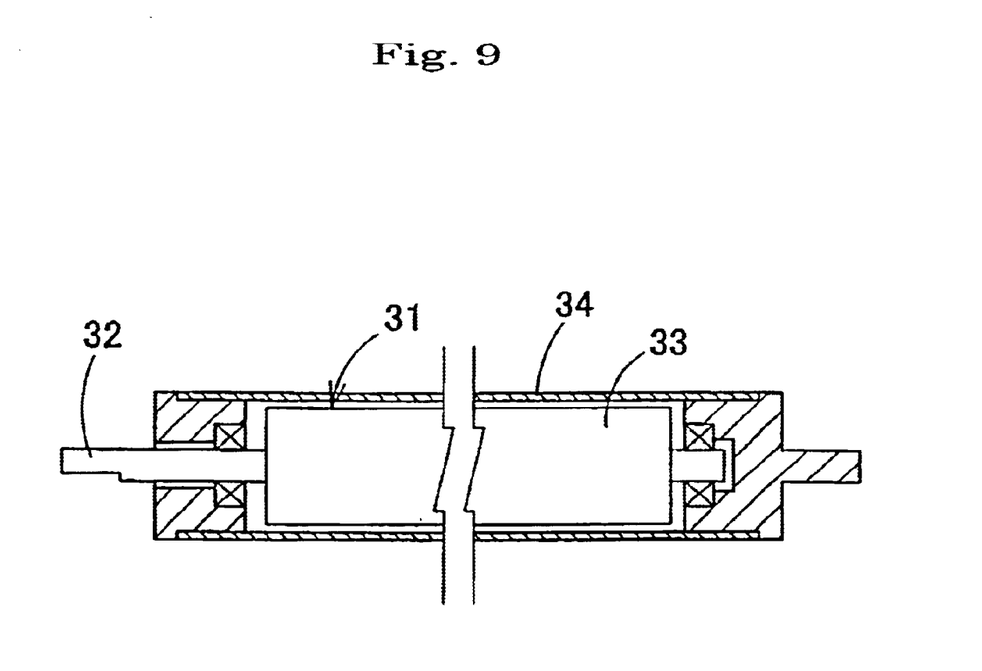
FIG. 9 is a schematic sectional view of a conventional development roller incorporated in a sleeve.

A magnet roller incorporated in an electrophotographic device is used as a development roller which performs development by supplying toner to an electrostatic latent image carrier and visualizing an electrostatic latent image or a cleaning roller which removes residual toner on the electrostatic latent image carrier after the visualized toner image is transferred to a sheet of paper. For example, when a magnet roller is used as a development roller, as shown in FIG. 9, a magnet roller 31 is constructed so that a body part 33 thereof made of a magnet material is formed around a shaft part 32, and is incorporated in a hollow cylindrical sleeve 34 made of an aluminum alloy etc. In the outer peripheral face of the body part 33 of the magnet roller 31 are provided a plurality of magnetic poles in a magnetized manner. A magnetic pole having a highest surface magnetic flux density of these magnetic poles is called a main magnetic pole, and is often used as a development pole. Conventionally, there has mainly been used a magnet roller in which a main magnetic pole (development pole) consisting of one magnetic pole is provided in the body part, and the surface magnetic flux density curve (magnetic force distribution curve) thereof exhibits a single high peak, or a magnet roller in which two magnetic poles with the same polarity are provided as main magnetic poles (development poles), and the magnetic force distribution curve thereof exhibits two high peaks (W peak).

The body part of the conventional magnet roller is made up of a bond magnet that is formed by injection molding or extrusion molding a material produced by mixing a resin binder such as a thermoplastic resin with strontium-based or barium-based ferrite magnetic powder or rare-earth magnetic powder (typical examples are Nd—Fe—B based magnetic powder and Sm—Co based magnetic powder). The magnetic characteristics necessary for the magnet roller are provided by applying an external magnetic field to the body part of the magnet roller to magnetize it at the time of molding or after the molding.

However, the conventional magnet roller mainly has problems of the following items (1) to (4).

(1) The magnet roller using ferrite-based magnetic powder cannot meet the requirement for high magnetic force. For the magnet roller in which the main magnetic pole is formed by a single magnetic pole, the magnetic force of the magnet roller having, for example, an outside diameter of 13.6 mm is 850 G at the maximum, and, even if a strong magnetic field (about 30 KOe) is applied at the time of magnetization, it is difficult to obtain a high magnetic force of 850 G or higher because of magnetic saturation.

(2) In recent years, a magnet roller in which the main magnetic pole is formed by a plurality of magnetic poles has been developed. However, the magnetic force at the main magnetic pole thereof is 600 G or lower, and thus the magnetic pole cannot have a high magnetic force capable of sufficiently playing a role as a development pole. The reason for forming the main magnetic pole by a plurality of magnetic poles is that the range of chain phenomenon of developer in the circumferential direction is wide, which offers an advantage of increasing the development efficiency.

(3) On the other hand, the magnet roller using rare-earth magnetic powder is barely able to provide a low magnetic force (about 700 G) by the magnetization in a weak magnetic field because the coercive force of rare-earth magnetic powder is relatively high (intrinsic coercive force (iHc): 5 KOe or higher). Therefore, a strong magnetic field (about 20 to 30 KOe) must be applied to obtain a high magnetic force, so that a magnetizing apparatus must inevitably be large in size and require high power, which results in complicated magnetizing process and high cost.

(4) The conventional rare-earth magnetic powder has a low Curie point of about 330° C., so that the use limit temperature thereof is restricted to a low temperature of about 130° C. Also, the conventional rare-earth magnetic powder has poor corrosion resistance and oxidation resistance, so that rust etc. are formed to decrease the magnetic characteristics. In order to prevent rust etc. from being formed, a surface coating such as plating is needed, which brings about an increased cost.

SUMMARY OF THE INVENTION

The present invention has been achieved to solve the above problems, and accordingly an object thereof is to provide a magnet roller capable of obtaining a high magnetic force even if the magnet roller is magnetized in a relatively weak magnetic field and capable of being produced at a low cost. In particular, another object of the present invention is to make the magnetic force of a main magnetic pole formed by a single magnetic pole a high magnetic force of 850 G or higher even if the magnet roller is magnetized in a weak magnetic field of 15 KOe or lower and to make the magnetic force of a main magnetic pole formed by a plurality of poles at a practically sufficient level. At the same time, still another object of the present invention is to provide a magnet roller in which a surface coating such as plating is not needed, and the corrosion resistance and oxidation resistance are high.

To attain the above objects, the inventor paid attention to a "nanocomposite magnet" made up of a soft magnetic material having a low coercive force and a hard magnetic material, in which the crystal grain size of the soft magnetic material is on the order of nanometer, and carried out studies earnestly on the magnet of this type. As a result, the inventor found that the nanocomposite magnet is suitable as a magnet material for a magnet roller, and came up with the present invention.

Specifically, the present invention provides a magnet roller comprising a body part and a shaft part supporting both ends of the body part, in which a plurality of magnetic poles are provided in a magnetized manner in the outer peripheral face of the body part, wherein the whole or a part of the body part is made up of a rare-earth bond magnet made of rare-earth magnetic powder, having a composite phase of a hard magnetic phase and a soft magnetic phase both magnetically exchange-interacting with each other and having a coercive force (iHc) of 5 KOe or lower and a residual magnetic flux density of 5 KG or higher, and a resin binder. Therefore, there can be obtained a magnet roller having magnetic characteristics of a low coercive force (iHc) provided by the presence of soft magnetic phase and a high residual magnetic flux density (Br) provided by magnetic exchange-interaction.

Also, the rare-earth magnetic powder preferably consists of exchange spring magnetic powder. "Exchange spring magnetism" is defined as a magnetic property that when a large amount of soft magnetic phase exists in a magnet, crystal grains of this soft magnetic phase and a hard magnetic phase are connected to each other by magnetic exchange-interaction, by which the magnetization of soft magnetic phase, which intrinsically has only a low coercive force and is easily reversed in a reverse magnetic field, becomes difficult to reverse even in the reverse magnetic field, and a mode looking as if both phases are connected to each other by a spring and thus a single phase consisting of hard magnetic phase only is exhibited (for example, see R. Coehoorn, K. H. J. Buschow et al.: J. de Phys., 49 (1988) C8-669).

The rare-earth magnetic powder using rare-earth element—iron—boron compound phase as the hard magnetic phase and iron phase or iron—boron compound phase as the soft magnetic phase, or the rare-earth magnetic powder using rare-earth element—iron—nitrogen compound phase as the hard magnetic phase and iron phase as the soft magnetic phase is suitable. Since the rare-earth magnetic powder of this kind contains a large amount of soft magnetic phase, the Curie point, which is an index of temperature dependence of residual magnetization, is mainly governed by the temperature dependency of soft magnetic phase. Therefore, the Curie point of the rare-earth magnetic powder takes a high value of about 400° C. or higher, and the temperature dependency of residual magnetization becomes low, so that the use limit temperature can be made as high as 200° C. or higher.

Also, it is preferable that 1 to 16 wt % of cobalt (Co) be added to the rare-earth magnetic powder. Thereby, a bond magnet manufactured of the rare-earth magnetic powder is caused to contain more Co than the conventional rare-earth Nd—Fe—B based magnet consisting mainly of a hard magnetic phase, so that the corrosion resistance and oxidation resistance are increased, and also the occurrence of rust etc. can be prevented without a surface coating such as plating. Specifically, if the Co content is lower than 1 wt %, the oxidation resistance etc. of the bond magnet decrease so that rust etc. are liable to be formed. On the other hand, if the Co content exceeds 16 wt %, the coercive force of the bond magnet decreases, so that it is difficult to maintain the magnetic characteristics necessary for the magnet roller.

Also, when a main magnetic pole is formed by a plurality of magnetic poles, it is preferable that the polarities of the adjacent magnetic poles of the magnetic poles forming the main magnetic pole be made reverse to each other. By making the polarities of the adjacent magnetic poles reverse to each other, the reversion (rotation) of developer caused by a change of magnetic polarity in the development zone (a zone in which developer chains toward a photosensitive material on the main magnetic pole) is generated with a rotation of the magnet roller in use, which offers an advantage that the supply efficiency of developer to a photosensitive material can be increased.

In order to control the magnetic force distribution of magnet roller, it is preferable that a magnet piece made up of the rare-earth bond magnet be provided in a groove formed along the axis near the main magnetic pole in the outer peripheral face of the body part. This rare-earth bond magnet can be formed by a single or a plurality of magnet pieces. When the main magnetic pole is formed by a plurality of rare-earth bond magnet pieces, it is preferable that the polarities of the adjacent rare-earth bond magnet pieces be make reverse to each other.

Also, the magnet roller may be formed by bondedly providing a plurality of magnet pieces each consisting of the rare-earth bond magnet on the outer peripheral face of the shaft part. For example, the magnet roller may be formed by bonding magnet pieces having a C-shaped cross section, which consist of the conventional ferrite resin magnet or the like in the outer peripheral face of the shaft part, and by fitting a single or a plurality of rare-earth bond magnet pieces in a C-shaped opening portion (near the main magnetic pole) of the magnet piece.

DETAILED DESCRIPTION OF THE PREFERRED EMBODIMENTS

Embodiments of a magnet roller in accordance with the present invention will now be described with reference to the accompanying drawings.

Figure 1:
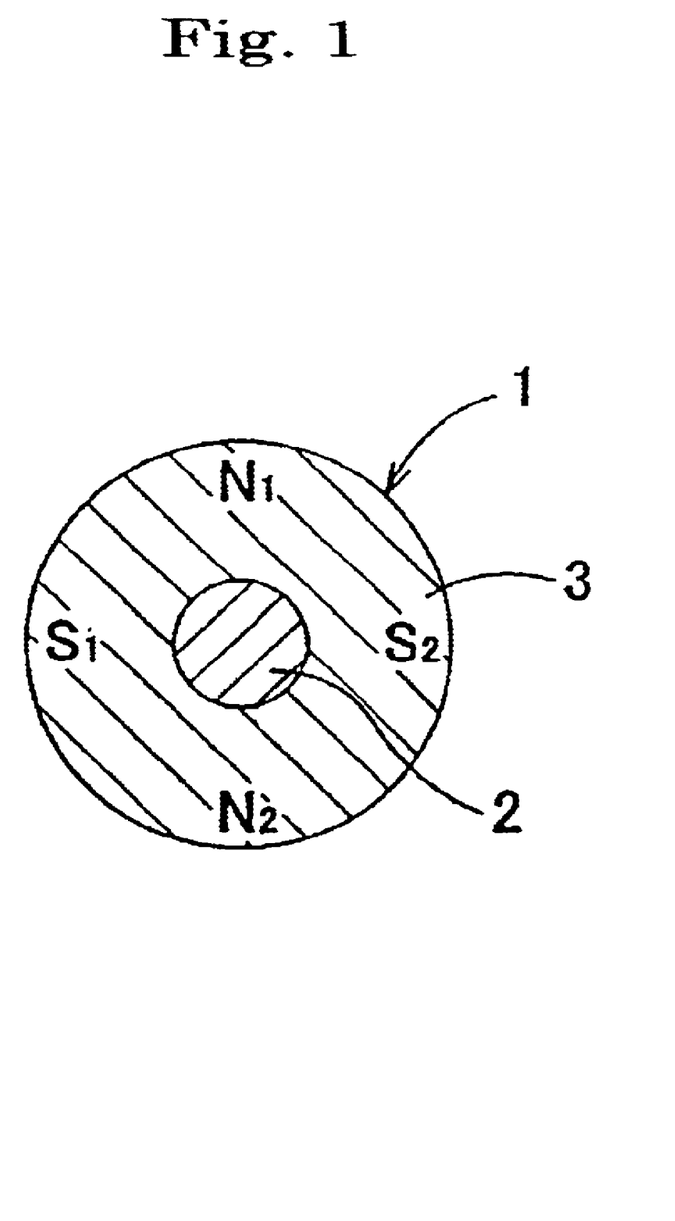
FIG. 1 is a schematic sectional view showing one embodiment of a magnet roller in accordance with the present invention.

Referring to the schematic sectional view of FIG. 1, a magnet roller 1 in accordance with the present invention is constructed so that a body part 3 is formed around a shaft part 2 made of stainless steel, aluminum alloy, resin, or the like. The body part 3 is made up of a rare-earth bond magnet made of rare-earth magnetic powder having a composite phase of a hard magnetic phase and a soft magnetic phase both magnetically exchange-interacting with each other and having a coercive force (iHc) of 5 KOe or lower and a residual magnetic flux density (Br) of 5 KG or higher. The rare-earth magnetic powder is preferably exchange spring magnetic powder in which the crystal grain size of soft magnetic phase is regulated to several tens of nanometers in order to make the exchange-interaction effective. Also, a plurality of magnetic poles (four poles of $N_1$, $S_2$, $N_2$ and $S_1$)

are provided in a magnetized manner in the outer peripheral face of the body part 3. A magnetic pole having the highest magnetic force, of these magnetic poles, is a main magnetic pole ($N_1$ pole in this embodiment). Although four magnetic poles are provided at equal intervals in this embodiment, the number of poles and the position of pole are not subject to any restriction in the present invention, and the number of poles and the position of pole can be set appropriately according to the desired magnetic characteristics; for example, five poles or six poles may be provided.

As a magnet material for the body part 3 of the magnet roller, a mixture in which 5 to 50 wt % of resin binder is mixed with 50 to 95 wt % of rare-earth magnetic powder is used as a main material, and as necessary, a silane-based or titanate-based coupling agent serving as a surface treatment agent of magnetic powder, an amide-based lubricant for improving the flowability of molten magnet material, a stabilizing agent for preventing the thermal decomposition of resin binder, a flame retardant, or the like is preferably added. If the content of the rare-earth magnetic powder is less than 50 wt %, the magnetic characteristics of magnet roller is decreased by a shortage of magnetic powder, so that a desirable magnetic force (850 G or higher at the main magnetic pole) is not obtained. If the content thereof exceeds 95 wt %, binder falls short, so that the formability of the body part 3 is impaired. Also, as the resin binder, one kind or two or more kinds of ethylene-ethyl acrylate resin, polyamide resin, polyethylene resin, polystyrene resin, PET (polyethylene terephthalate), PBT (polybutylene terephthalate), PPS (polyphenylene sulfide), EVA (ethylene-vinyl acetate copolymer), EVOH (ethylene-vinylalcohol copolymer), PVC (polyvinyl chloride), or the like, or one kind-or two or more kinds of epoxy resin, phenolic resin, urea resin, melamine resin, furan resin, unsaturated polyester resin, polyimde resin, and other thermosetting resins can be used mixedly.

As the rare-earth magnetic powder, exchange spring magnetic powder of rare earth element (R)—iron (Fe)—nitrogen (N) alloy or rare earth element (R)—iron (Fe)—boron (B) alloy containing a hard magnetic phase and a soft magnetic phase is preferably used. Also, exchange spring magnetic powder of rare earth element (R)—iron (Fe)—cobalt (Co) alloy may be used. As the aforementioned R, Sm or Nd is preferably used, and besides, one kind or two or more kinds of Pr, Dy and Tb can be used combinedly. Also, in order to enhance the magnetic characteristics by replacing some of the aforementioned Fe, one or two or more kinds of elements of Co, Ni, Cu, Zn, Ga, Ge, Al, Si, Sc, Ti, V, Cr, Mn, Zr, Nb, Mo, Tc, Ru, Rh, Pd, Ag, Cd, In, Sn, Sb, Hf, Ta, W, Re, Os, Ir, Pt, Au, Hg, Tl, Pb, Bi, etc. may be added. More specifically, exchange spring magnetic powder such as Nd—Fe—B based alloy (soft magnetic phase: Fe—B alloy, αFe), Sm—Fe—N based alloy (soft magnetic phase: αFe), And Nd—Fe—Co—Cu—Nb—B based alloy (soft magnetic phase: Fe—B alloy, αFe etc.), and Nd—Fe—Co based alloy (soft magnetic phase: αFe etc.) is suitable. In particular, from the viewpoint of decreasing coercive force (iHc) and increasing residual magnetic flux density (Br), exchange spring magnetic powder of $Nd_4Fe_{80}B_{20}$ alloy (soft magnetic phase: $Fe_3B$, αFe) or $Sm_2Fe_{17}N_3$ alloy (soft magnetic phase: αFe) is preferable.

Also, it is preferable that especially 1 to 16 wt % Co and further 3 to 13 wt % Co be added to the aforementioned exchange spring magnetic powder. For a bond magnet manufactured by the rare-earth magnetic powder, the magnetic characteristics are improved and the corrosion resistance and oxidation resistance are increased by this addition of Co, so that the formation of rust etc. can be restrained without a surface coating on the outside surface thereof.

In order to manufacture the aforementioned exchange spring magnetic powder, a rapid quenching method, mechanical alloying method, or the like is used. Specifically, there are cited a method in which each feedstock element is weighed, alloy powder obtained by mechanical alloying is heat-treated, and as necessary, nitriding treatment is performed, a method in which each feedstock element is weighed, an alloy containing an amorphous or near-amorphous microstructure obtained by rapid quenching using the single roll method is ground and then subjected to heat treatment to deposit crystal, and as necessary, nitriding treatment is performed, or the like methods. By properly controlling the quenching conditions (rolling speed, etc.), grinding conditions, heat treatment conditions (treatment time, temperature), or the like conditions, exchange spring magnetic powder having a soft magnetic phase with a crystal grain size of several tens of nanometers can be manufactured. The aforementioned nitriding treatment is necessary when R—Fe—N based exchange spring magnetic powder is manufactured.

The magnet roller in accordance with the present invention and a magnet piece described later are formed by the extrusion molding method or the injection molding method using pellets obtained by melting and kneading the aforementioned magnet material. Alternatively, they may be formed by the compression molding method using the aforementioned magnet material. The magnetization of the magnet roller and the magnet piece is provided by performing oriented magnetization simultaneously with the injection molding or extrusion molding, by performing magnetization again after demagnetization performed once to remove internal strain or to facilitate mold release, or by performing magnetization after molding without oriented magnetization at the time of molding. In forming and assembling the magnet roller, the magnet roller can be formed by integrally molding the body part and the shaft part thereof, by installing the shaft part to both ends of the body part or penetratingly installing the shaft part in the cylindrically-shaped body part, or by bonding a magnet piece formed into an irregular shape such as semicylindrical shape or fan shape to the shaft part with a circular, elliptical, or polygonal cross-sectional shape.

Figure 2:
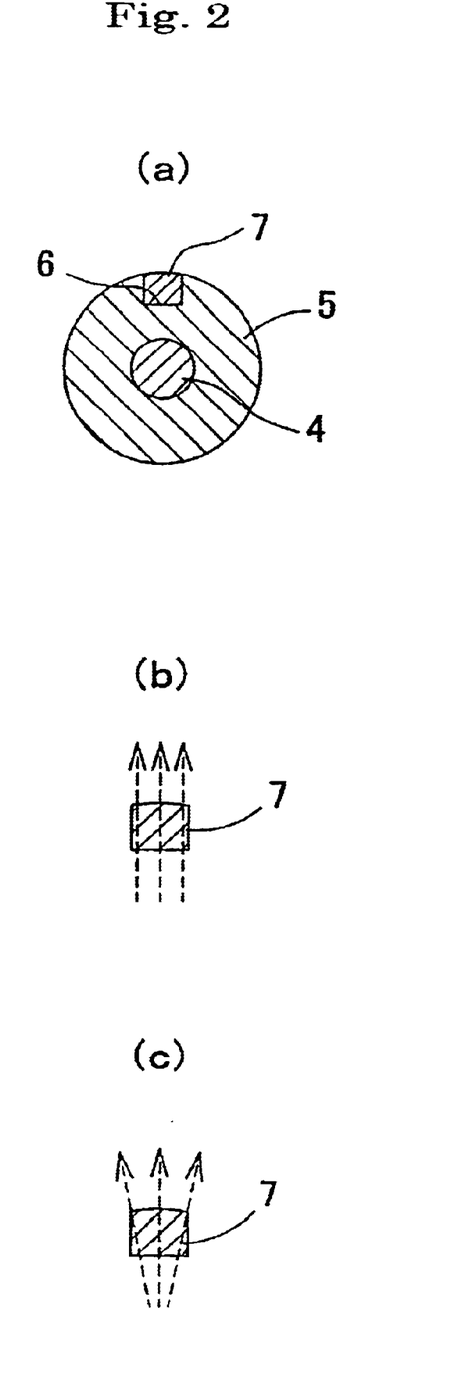
FIG. 2 is a schematic view showing another embodiment of the magnet roller in accordance with the present invention.
Figure 3:
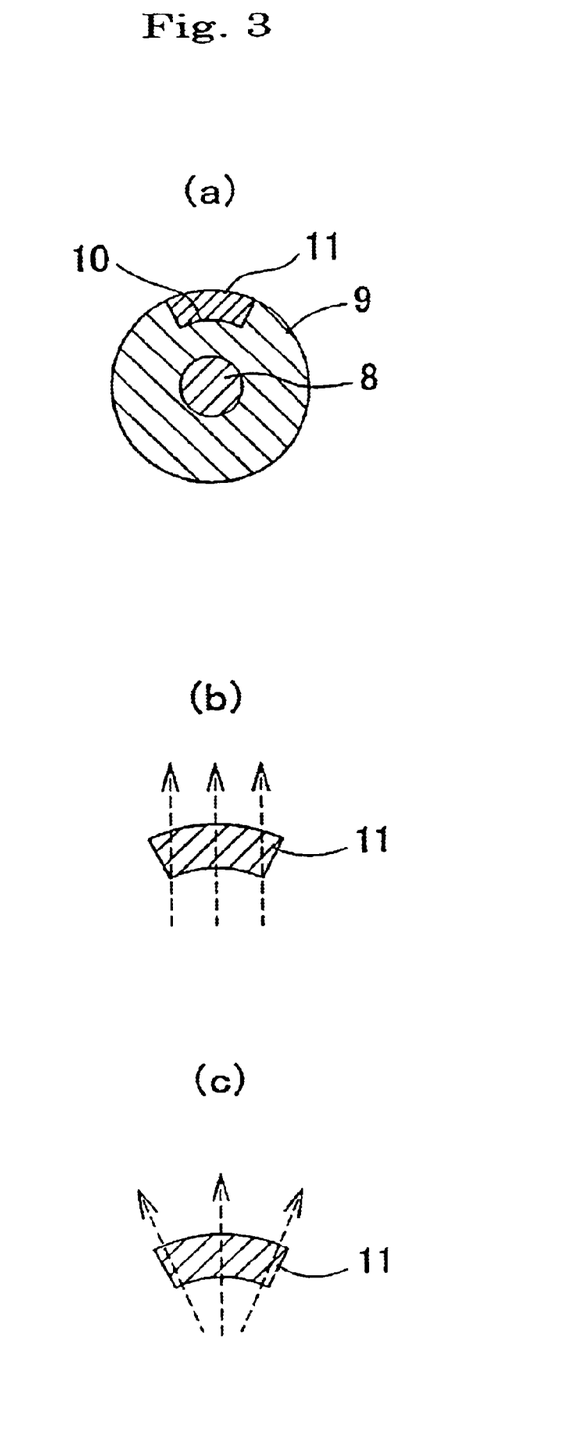
FIG. 3 is a schematic view showing still another embodiment of the magnet roller in accordance with the present invention.

It is preferable that, for example, as shown in the schematic sectional view of FIG. 2 (or FIG. 3), a magnet piece 7 (11) formed of the aforementioned rare-earth bond magnet be provided in a groove 6 (10) formed along the axis near the main magnetic pole in a body part 5 (9) of a magnet roller. This magnet piece preferably is a square piece 7 having a square shaped cross-section as shown in FIG. 2 or a semi-fan shaped piece 11 having a semi-fan shaped cross section as shown in FIG. 3. The piece having such a shape is easily made common to a piece for another magnet roller, and also has high formability and bondability.

Figure 4:
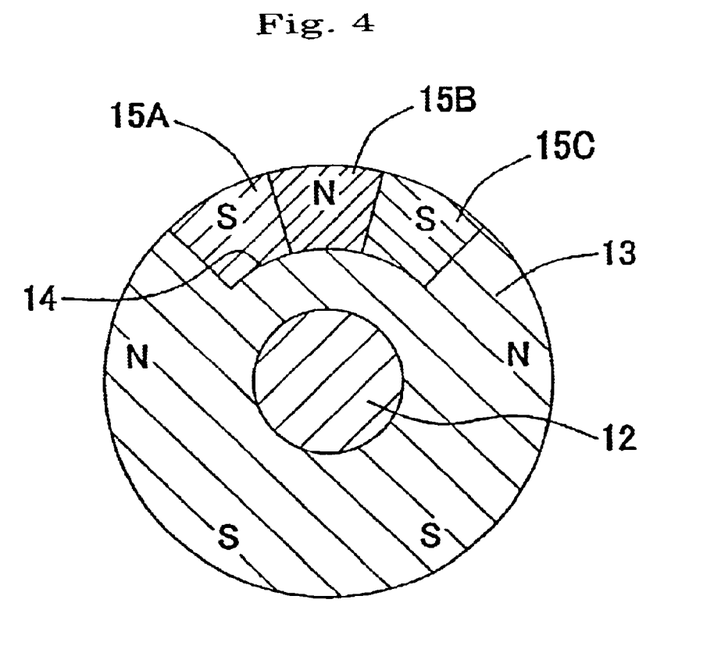
FIG. 4 is a schematic view showing still another embodiment of the magnet roller in accordance with the present invention.

When the main magnetic pole is composed of a plurality of magnetic poles, as shown in the schematic sectional view of FIG. 4, the main magnetic poles can be formed by forming a body part 13 provided with a groove 14 having a fan-shaped cross section, which is provided with a plurality of magnetic poles (N pole, S pole, N pole, S pole) in the surface thereof, on the outer peripheral face of a shaft part 12, and by bondedly providing magnet pieces 15A, 15B and 15C consisting of the aforementioned rare-earth bond magnet and each having S pole, N pole, and S pole in the surface thereof in the groove 14 so that the magnetic polarities of the adjacent magnet pieces are reverse to each other.

Figure 5:
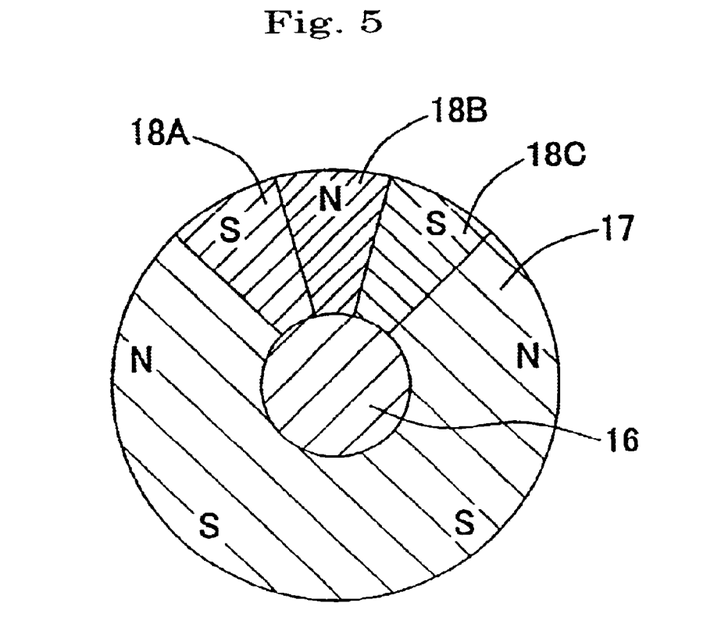
FIG. 5 is a schematic view showing still another embodiment of the magnet roller in accordance with the present invention.

Alternatively, as shown in the schematic sectional view of FIG. 5, the main magnetic poles can be formed by bonding a ferrite bond magnet 17 having a C-shaped cross section, which is provided in a magnetized manner with a plurality of magnetic poles (N pole, S pole, N pole, S pole) in the surface thereof, to the outer peripheral face of a shaft part 16, and by bondedly providing magnet pieces 18A, 18B and 18C consisting of the aforementioned rare-earth bond magnet and each having S pole, N pole, and S pole in the surface thereof in a C-shaped opening portion (near the main magnetic pole) of the ferrite bond magnet 17 so that the magnetic polarities of the adjacent magnet pieces are reverse to each other.

Figure 6:
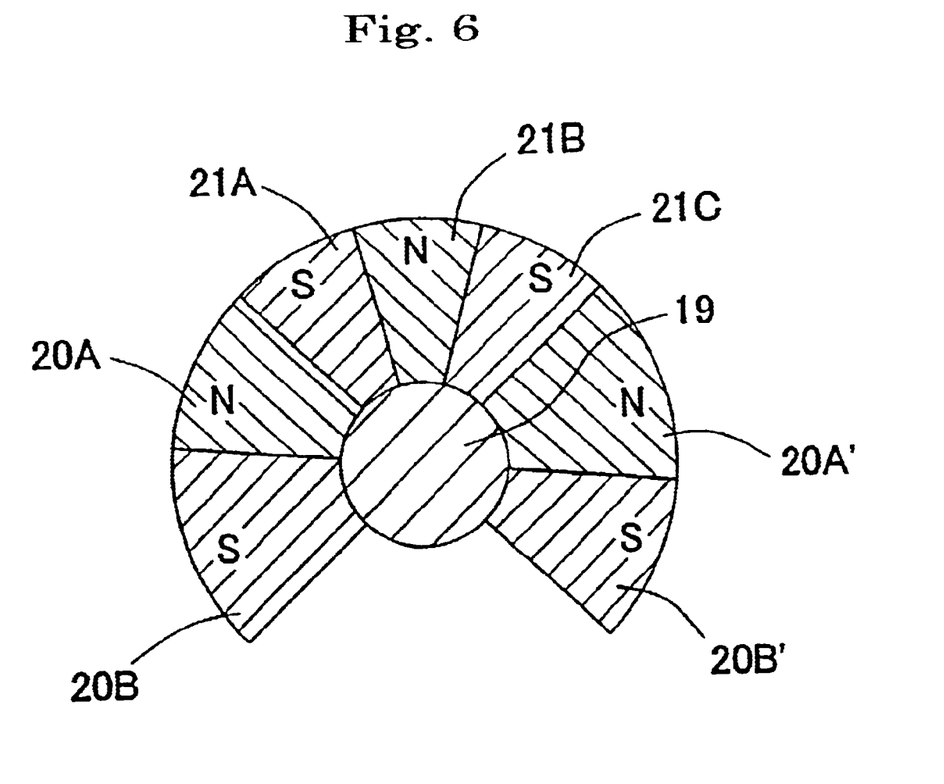
FIG. 6 is a schematic view showing still another embodiment of the magnet roller in accordance with the present invention.

Also, as shown in the schematic sectional view of FIG. 6, a magnet roller can be manufactured by bondedly providing magnet pieces 21A, 21B and 21C consisting of the aforementioned rare-earth bond magnet and each having S pole, N pole, and S pole in the surface thereof on the outer peripheral face of a shaft part 19 to form the main magnetic poles, and by bonding ferrite bond magnet pieces 20A, 20B, 20A' and 20B' having other magnetic poles to the outer peripheral face of the shaft part 19.

In the present invention, the shape of magnet piece is not subject to any restriction, and the shape thereof can be changed appropriately according to the desired magnetic characteristics (magnetic force, magnetic force distribution waveform, etc.). Also, in order to manufacture the above-described magnet roller, what we call the two-color molding method can be used in which two injection molding machines are used, and after the body part is molded by a first injection molding machine, the magnet piece is molded in the groove by a second injection molding machine. This method is effective in significantly simplifying the manufacturing process.

As the magnetic field orientation of the magnet piece, random orientation, straight orientation as indicated by the arrows in FIGS. 2B and 3B, and radial orientation as indicated by the arrows in FIGS. 2C and 3C are typical examples. Also, not shown in the drawings, the magnetic force distribution of magnet roller can be controlled by converging the magnetic flux density of applied magnetic field to control the oriented magnetization amount at any place on both side faces and the back side face to the surface side face of the magnet piece 7 (11). This control is effective, for example, when the magnetic force distribution waveform in the main magnetic pole is made asymmetric. Also, the magnet roller can be formed by combining magnet pieces each having a different orientation, and the combination may be selected appropriately according to the required specification.

The use of isotropic magnetic powder as the rare-earth magnetic powder in accordance with the present invention and the magnetization of the magnet roller performed after molding are desirable because a desired position of the magnet roller is easily magnetized into a desired magnetic force. In particular, since a magnetic circuit need not be formed in the molding apparatus, the molding die is low in cost. Also, since there is no deformation of bond magnet caused by the applied magnetic field at the time of molding, the dimensional accuracy after molding is high, so that magnetization is easy to perform, and the pole position can be set with high accuracy.

EXAMPLES

The following is a description of more specific examples in accordance with the present invention and comparative examples. The following examples do not impose any restriction on the present invention.

Figure 7:
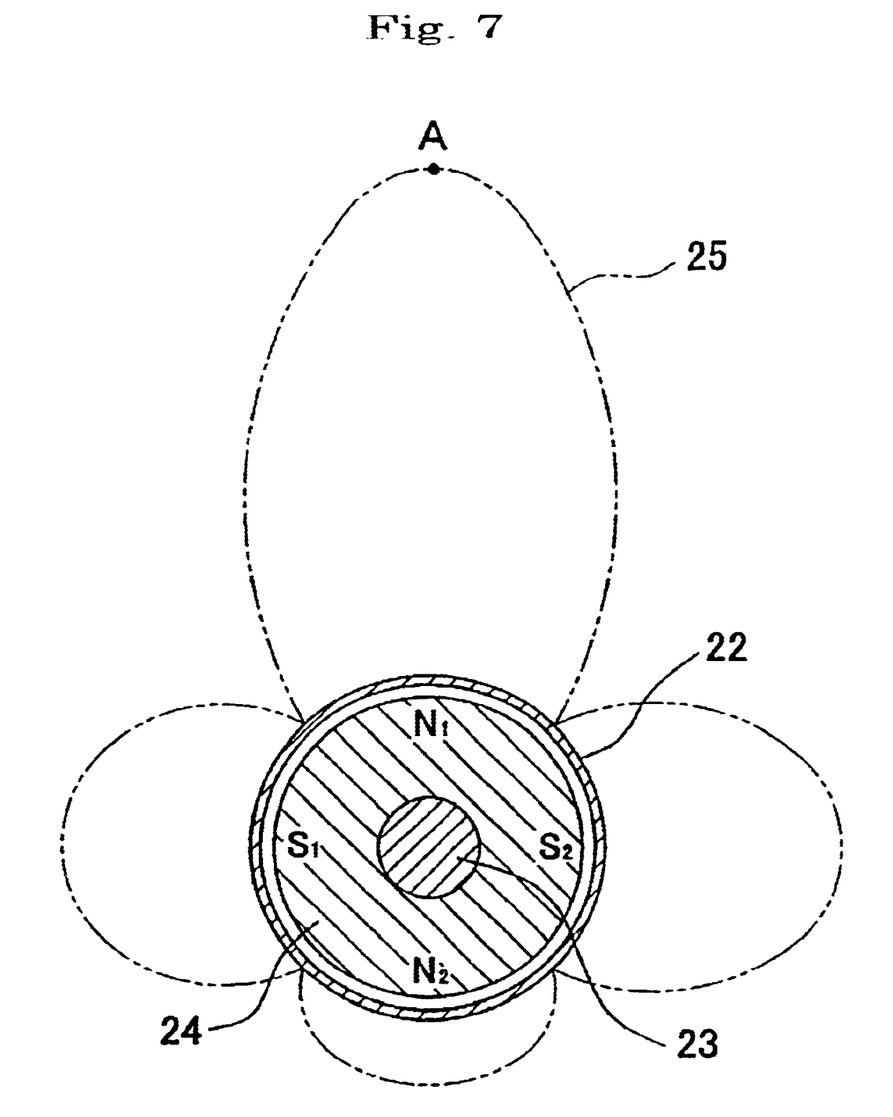
FIG. 7 is a schematic view showing magnetic force distribution around a circumference of a magnet roller of an example.

The magnet roller of examples 1 to 3 and comparative examples 1 to 4 described in detail below was manufactured by mixing, melting, and kneading 10 wt % of resin binder (nylon 12) and 90 wt % of magnetic powder to form pellets, by forming a roller (diameter: 13.6 mm, overall length: 320 mm) by injection molding using these pellets, and then by applying an external magnetic field to magnetize four poles ($N_1$, $S_2$, $N_2$, $S_1$) as shown in FIG. 7. The magnetic force distribution of this magnet roller was measured in a state of being incorporated in a sleeve 22 made of an aluminum alloy. In FIG. 7, the $N_1$ pole is the main magnetic pole, and reference numeral 23 denotes a shaft part, 24 denotes a body part, and 25 denotes a distribution waveform of magnetic force. Point A designates the highest value of the magnetic force distribution at the main magnetic pole.

Example 1

A magnet roller was manufactured by mixing and kneading nylon 12 used as a resin binder and exchange spring magnetic powder of $Nd_4Fe_{80}B_{20}$ (intrinsic coercive force iHc: 3.0 KOe, residual magnetic flux density Br: 12 KG, Co content: 2 wt %) used as magnetic powder to form pellets, by forming a roller by injection molding, and then by magnetizing the roller with an intensity of applied magnetic field of 8 to 15 KOe.

Example 2

A magnet roller was manufactured by the same way as that of example 1 except that exchange spring magnetic powder of $Nd_5Fe_{71}Co_5Cu_{0.5}Nb_1B_{17.5}$ (intrinsic coercive force iHc: 4.8 KOe, residual magnetic flux density Br: 5.2 KG, Co content: 6 wt %) was used as magnetic powder.

Example 3

A magnet roller was manufactured by the same way as that of example 1 except that exchange spring magnetic powder of $Sm_2Fe_{17}N_3$ (coercive force iHc: 4.0 KOe, residual magnetic flux density Br: 7.8 KG, Co content: 1 wt %) was used as magnetic powder.

Comparative Example 1

A magnet roller was manufactured by the same way as that of example 1 except that ferrite magnetic powder of $SrO \cdot 6Fe_2O_3$ (coercive force iHc: 3 KOe, residual magnetic flux density Br: 4.8 KG, Co content: 0 wt %) was used as magnetic powder.

Comparative Example 2

A magnet roller was manufactured by the same way as that of example 1 except that ferrite magnetic powder of $SrO \cdot 6Fe_2O_3$ (coercive force iHc: 3 KOe, residual magnetic flux density Br: 4.8 KG, Co content: 0 wt %) was used as magnetic powder, and the intensity of applied magnetic field was 20 to 30 KOe.

Comparative Example 3

A magnet roller was manufactured by the same way as that of example 1 except that rare-earth magnetic powder ($Nd_{13.5}Fe_{1.7}B_{4.8}$; coercive force iHc: 14 KOe, residual magnetic flux density Br: 8.4 KG, Co content: 0.5 wt %) was used as magnetic powder.

Comparative Example 4

A magnet roller was manufactured by the same way as that of example 1 except that rare-earth magnetic powder ($Nd_{13.5}Fe_{1.7}B_{4.8}$; coercive force iHc: 14 KOe, residual magnetic flux density Br: 8.4 KG, Co content: 0.5 wt %) was used as magnetic powder, and the intensity of applied magnetic field was 20 to 30 KOe.

Figure 8:
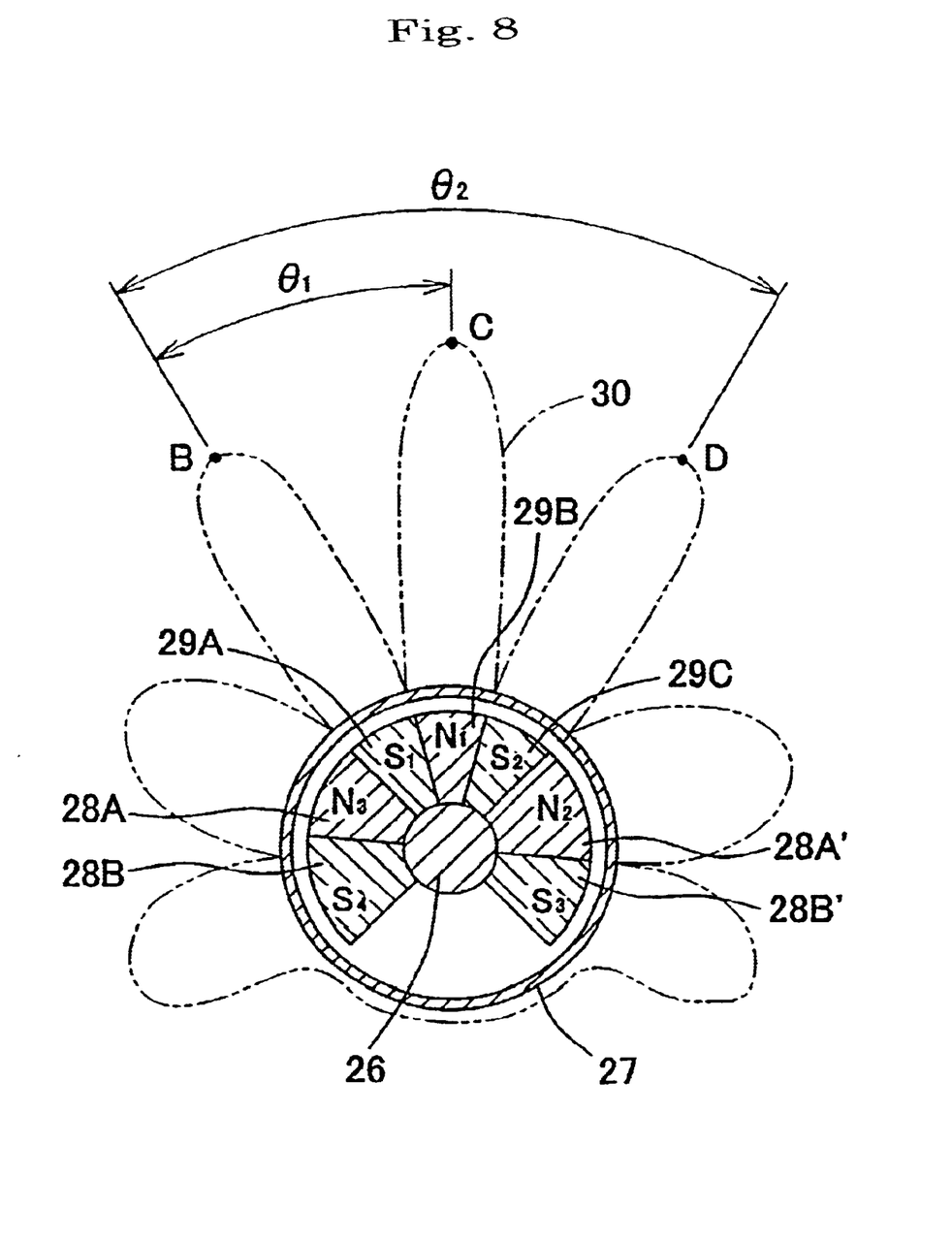
FIG. 8 is a schematic view showing magnetic force distribution around a circumference of a magnet roller of another example.

Next, a magnet roller of example 4 and comparative example 5 described in detail below is formed by bonding magnet pieces 29A to 29C, 28A, 28B, 28A' and 28B' to each other on the outer peripheral face of a shaft part 26 as shown in FIG. 8 (diameter: 13.6 mm, overall length: 320 mm). Each of the magnet pieces was manufactured by mixing, melting, and kneading 10 wt % of resin binder (nylon 12) and 90 wt % of magnetic powder to form pellets, by molding the magnet piece by injection molding using these pellets, and then by applying an external magnetic field for magnetization after the molding. In FIG. 8, the $S_1$ pole, $N_1$ pole, and $S_2$ pole are main magnetic poles, and reference character 26 denotes a shaft part, 28A, 28B, 28A' and 28B' denote ferrite bond magnet pieces, 29A to 29C denote rare-earth bond magnet pieces, and 30 denotes a magnetic force distribution waveform. Points B, C and D designate the highest value of magnetic force distribution at the main magnetic poles.

In FIG. 8, the pole-to-pole angle ($\theta_2$) between the magnetic force peak position (point B) at the pole on the upstream side of developer transfer and the magnetic force peak position (point D) at the pole on the downstream side of developer transfer was set at 60 degrees. Incidentally, the pole-to-pole angle ($\theta_1$) between point B and point C is 30 degrees. If the pole-to-pole angle ($\theta_2$) between point B and point D exceeds 60 degrees, the chain of developer near point C which faces a photosensitive material is coarse, which is the same as the state of chain in the development zone of the conventional magnet roller. At the same time, the reversion (rotation) of developer caused by a change of magnetic polarity is inactive. Therefore, the amount of toner supplied to the photosensitive material decreases, so that high picture quality cannot be achieved. On the other hand, if the pole-to-pole angle ($\theta_2$) is smaller than 30 degrees, a high magnetic force cannot be obtained even if the aforementioned rare-earth bond magnet pieces are used for the main magnetic pole part, and thus it was verified that it is difficult to achieve high picture quality.

Example 4

As magnetic powder for magnet pieces having the $S_1$ pole, $N_1$ pole, and $S_2$ pole, forming the main magnetic poles, exchange spring magnetic powder of $Nd_4Fe_{80}B_{20}$ (intrinsic coercive force iHc: 3.0 KOe, residual magnetic flux density Br: 12 KG, Co content: 2 wt %) was used, and as a resin binder, nylon 12 was used. Both of the materials were mixed and kneaded to form pellets, and magnet pieces having a fan-shaped cross section were formed by injection molding using these pellets. After the magnet pieces were magnetized by applying an external magnetic field, the magnet pieces were bonded to each other on the outer peripheral face of the shaft part 26.

Also, as magnetic powder for magnet pieces having the $N_2$ pole, $S_3$ pole, $S_4$ pole, and $N_3$ pole, forming magnetic poles other than the main magnetic poles, ferrite magnetic powder of $SrO \cdot 6Fe_2O_3$ (coercive force iHc: 3 KOe, residual magnetic flux density Br: 4.8 KG) was used, and as a resin binder, nylon 12 was used. Both of the materials were mixed and kneaded to form pellets, and magnet pieces having a fan-shaped cross section were formed by injection molding. After oriented magnetization was effected simultaneously with the molding, the magnet pieces were bonded to each other on the outer peripheral face of the shaft part 26.

Comparative Example 5

The exchange spring magnetic powder used for the magnet pieces forming the main magnetic poles ($S_1$ pole, $N_1$ pole, and $S_2$ pole) in the above-described example 4 was changed to ferrite magnetic powder of $SrO \cdot 6Fe_2O_3$ (coercive force iHc: 3 KOe, residual magnetic flux density Br: 4.8 KG, Co content: 0 wt %). This ferrite magnetic powder and nylon 12 were mixed and kneaded to form pellets, and magnet pieces having a fan-shaped cross section were formed by injection molding using these pellets. Thereafter, a magnet roller was manufactured in the same way as that of example 4 except that oriented magnetization was effected simultaneously with the molding.

The magnetic force distributions of the above-described examples and comparative examples were measured by using a gauss meter, by arranging probes in positions 1.2 mm distant from the surface of magnet roller in the radial direction (positions 8.0 mm distant from the center axis of magnet roller in the radial direction), and by turning the magnet roller in the circumferential direction. The magnetic characteristics of the magnetic powder and magnet rollers used in examples and comparative examples are given in Tables 1 and 2, and the oxidation resistance was given in Table 3. Regarding the oxidation resistance, after the manufactured magnet roller was left in air for 168 hours, the presence of rust on the surface of magnet roller was checked visually. The magnetic characteristics given in Tables 1 and 2 include "intrinsic coercive force iHc" and "residual magnetic flux density Br" of magnetic powder, "intrinsic coercive force iHc after molding" and "residual magnetic flux density Br" of magnet roller, "intensity of magnetic field for magnetization of main magnetic pole", and "magnetic force of main magnetic pole" at points A to D after magnetization.

TABLE 1

| | Magnetic characteristics of magnetic powder | | Magnetic characteristics after molding | | | |
|---|---|---|---|---|---|---|
| | Coercive force iHc (KOe) | Residual magnetic flux density Br (KG) | Coercive force iHc (KOe) | Residual magnetic flux density Br (KG) | Intensity of magnetic field for magnetization of main magnetic pole (KOe) | Magnetic force of main magnetic pole (G) Point A |
| Example 1 | 3.0 | 12.0 | 3.0 | 7.0 | 15 | 1800 |
| Example 2 | 4.8 | 5.2 | 4.8 | 3.2 | 15 | 850 |
| Example 3 | 4.0 | 7.8 | 4.0 | 4.6 | 15 | 1200 |
| Comparative example 1 | 3.0 | 4.8 | 3.0 | 3.0 | 15 | 800 |
| Comparative example 2 | 3.0 | 4.8 | 3.0 | 3.0 | 30 | 800 |
| Comparative example 3 | 14.0 | 8.4 | 14.0 | 5.1 | 15 | 700 |
| Comparative example 4 | 14.0 | 8.4 | 14.0 | 5.1 | 30 | 1350 |

TABLE 2

| | Magnetic characteristics of magnetic powder | | Magnetic characteristics after molding | | Intensity of magnetic field for magnetization of main magnetic pole | Magnetic force of main magnetic pole (G) | | |
|---|---|---|---|---|---|---|---|---|
| | Coercive force | Residual magnetic flux density | Coercive force | Residual magnetic flux density | | | | |
| | iHc (KOe) | Br (KG) | iHc (KOe) | Br (KG) | (KOe) | Point B | Point C | Point D |
| Example 4 | 3.0 | 12.0 | 3.0 | 7.0 | 15.0 | 800 | 950 | 800 |
| Comparative example 5 | 3.0 | 4.8 | 3.0 | 3.0 | 15.0 | 450 | 550 | 450 |

TABLE 3

| | Example 1 | Example 2 | Example 3 | Example 4 |
|---|---|---|---|---|
| Presence or absence of rust | Absent | Absent | Absent | Absent |

| | Comparative example 1 | Comparative example 2 | Comparative example 3 | Comparative example 4 | Comparative example 5 |
|---|---|---|---|---|---|
| Presence or absence of rust | Absent | Absent | Present | Present | Absent |

Evaluation of Examples 1 to 3 and Comparative Examples 1 to 4 in Which the Main Magnetic Pole is Formed of a Single Pole As is apparent-from the results given in Table 1, for the magnet roller using exchange spring magnetic powder in examples 1 to 3, when magnetization was effected in a weak magnetic field (15 KOe), a magnetic force of 850 G or higher was obtained in all of the examples; on the other hand, for the magnet roller made up of a conventional ferrite bond magnet in comparative examples 1 and 2, a magnetic force of only 800 G was obtained even if magnetization was effected in a weak magnetic field (15 KOe) or a strong magnetic field (30 KOe). Also, for the magnet roller made up of a conventional rare-earth bond magnet in comparative examples 3 and 4, when magnetization was effected in a strong magnetic field (30 KOe) as in comparative example 4, a magnetic force as high as 1350 G was obtained; however, when magnetization was effected in a weak magnetic field (15 KOe) as in comparative example 3, a magnetic force of only 700 G was obtained. Therefore, it was verified that the magnet rollers of these examples can provide a high magnetic force (850 G or higher) by means of magnetization effected in a weak magnetic field (15 KOe or lower).

Also, as is apparent from the results given in Table 3, in examples 1 to 3 in which exchange spring magnetic powder was used and in comparative examples 1 and 2 in which conventional ferrite magnetic powder was used, rust was not formed at all; on the other hand, in comparative examples 3 and 4 in which rare-earth magnetic powder mainly consisting of a hard magnetic phase, the occurrence of rust was confirmed.

Evaluation of Example 4 and Comparative Example 5 in Which the Main Magnetic Pole is Formed of Three Poles As is apparent from the results given in Table 2, in example 4, the magnetic forces of all three poles constituting the main magnetic pole were 800 G or higher; on the other hand, in comparative example 5, the magnetic forces of all three poles constituting the main magnetic pole were only 600 G or lower. Therefore, it was verified that for the magnet roller of example 4, even if the three magnetic poles are arranged in the range of 60 degrees near the main magnetic pole, a high magnetic force (800 G or higher) enough for development can be obtained, and the chain of developer near point C is dense.

Also, according to Table 3, in example 4 in which exchange spring magnetic powder was used and in comparative example 5 in which conventional ferrite magnetic powder was used, rust was not formed at all.

According to the magnet roller in accordance with the present invention, since the body part thereof is made up of a rare-earth bond magnet made of rare-earth magnetic powder having a composite phase of a hard magnetic phase and a soft magnetic phase both magnetically exchange-interacting with each other and having a coercive force (iHc) of 5 KOe or lower and a residual magnetic flux density of 5 KG or higher, the low coercive force of soft magnetic phase and magnetization generally higher than the hard magnetic phase can be utilized, so that a high magnetic force can be obtained even if magnetization is effected in a weak magnetic field. Especially when the main magnetic pole is formed by a single pole, even if magnetization is effected in a weak magnetic field of 8 to 15 KOe, a high magnetic force of 850 G or higher can be obtained. Also, even when the main magnetic pole is formed by a plurality of poles, a high magnetic force of 800 G or higher can be obtained. Therefore, a magnet roller having high development efficiency can be provided. Since the main magnetic pole can be magnetized in a weak magnetic field, the large size and high power of magnetizing apparatus can be avoided, so that a magnet roller having excellent magnetic characteristics can be provided while the manufacturing cost is kept low.

Also, by adding 1 to 16 wt % of cobalt to the rare-earth magnetic powder, a magnet roller that does not require a surface coating such as plating and has high corrosion resistance and oxidation resistance can be obtained, so that the magnet roller can have stable magnetic characteristics for a long period of time.

Further, by forming the main magnetic pole by a plurality of magnetic poles and making the polarities of adjacent magnetic poles of the magnetic poles forming the main magnetic pole reverse to each other, the chain of developer near the main magnetic pole can be made dense at the time of use, and also the reversion (rotation) of developer caused by a change of magnetic polarity in the development zone is active, so that the supply efficiency of developer to a photosensitive material increases, which can achieve high picture quality.

What is claimed is:

1. A magnet roller comprising:

a body part; and a shaft part supporting both ends of said body part, in which a plurality of magnetic poles are provided in a magnetized manner in the outer peripheral face of said body part, wherein the whole or a part of said body part is made up of a rare-earth bond magnet made of rare-earth magnetic powder, having a composite phase of a hard magnetic phase and a soft magnetic phase both magnetically exchange-interacting with each other and having a coercive force (iHc) of 5 KOe or lower and a residual magnetic flux density of 5 KG or higher, and a resin binder.

2. The magnet roller according to claim 1, wherein said rare-earth magnetic powder consists of exchange spring magnetic powder.

3. The magnet roller according to claim 1 or 2, wherein rare-earth element—iron—boron compound phase is used as said hard magnetic phase, and iron phase or iron—boron compound phase is used as said soft magnetic phase.

4. The magnet roller according to claim 1 or 2, wherein rare-earth element—iron—nitrogen compound phase is used as said hard magnetic phase, and iron phase is used as said soft magnetic phase.

5. The magnet roller according to any one of claims 1 or 2, wherein 1 to 16 wt % of cobalt is added to said rare-earth magnetic powder.

6. The magnet roller according to any one of claims 1 or 2, wherein a main magnetic pole is formed by a plurality of magnetic poles, and the polarities of the adjacent magnetic poles of said magnetic poles forming said main magnetic pole are made reverse to each other.

7. The magnet roller according to any one of claims 1 or 2, wherein a magnet piece made up of said rare-earth bond magnet is provided in a groove formed along the axis near the main magnetic pole in the outer peripheral face of said body part.

8. The magnet roller according to any one of claims 1 or 2, wherein a plurality of magnet pieces each made up of said rare-earth bond magnet are bondedly provided on the outer peripheral face of said shaft part.

* * * * *